Figure 1:
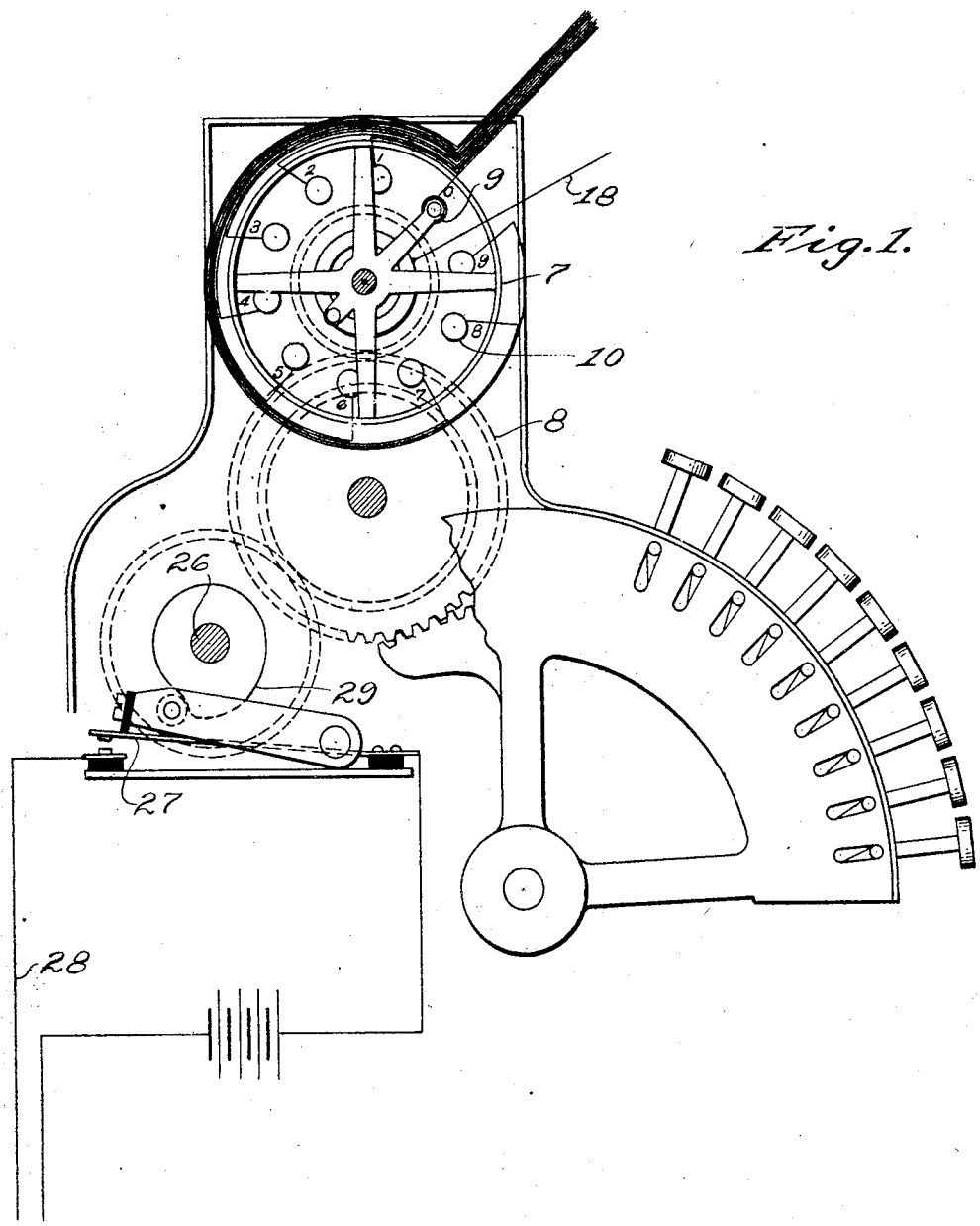

C. F. KETTERING.
INDICATING MECHANISM.
APPLICATION FILED DEC. 21, 1907.

1,116,440.

Patented Nov. 10, 1914.
5 SHEETS—SHEET 1.

Witnesses
Carl Benst
Al. Hubig

Inventor
Charles F. Kettering
by J. B. Hayward
and R. Chslager
Attorneys

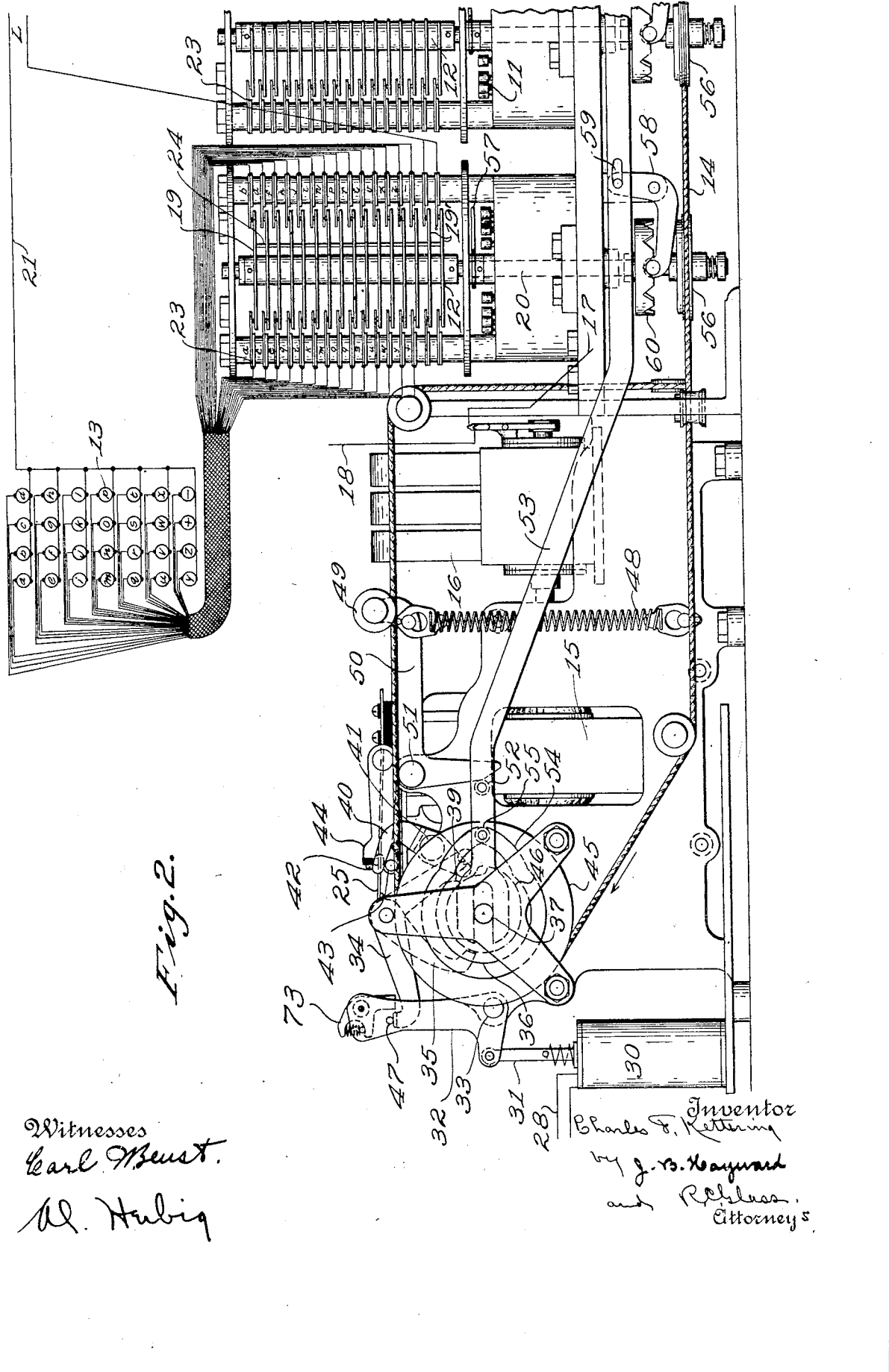

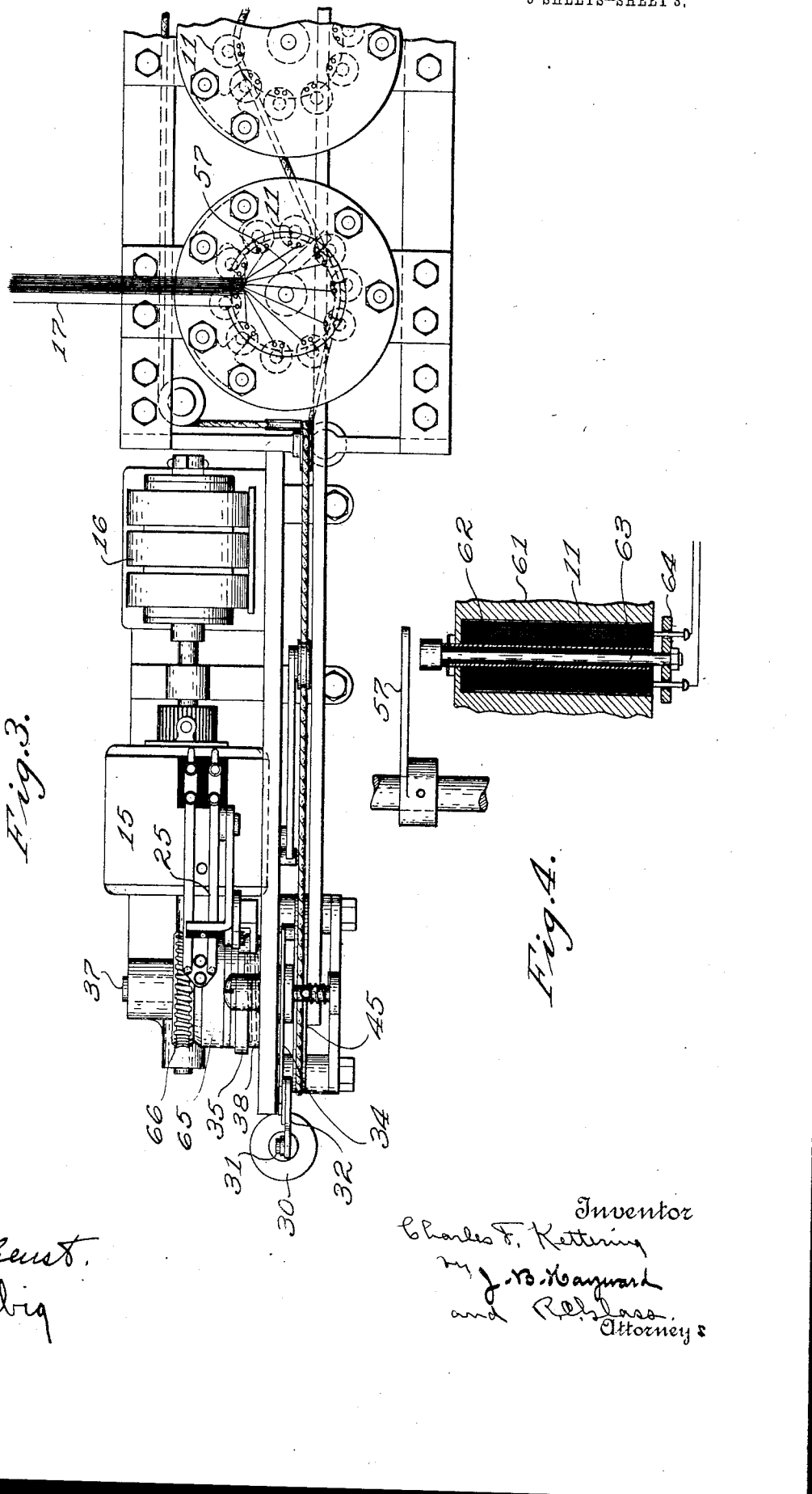

C. F. KETTERING.
INDICATING MECHANISM.
APPLICATION FILED DEC. 21, 1907.
1,116,440.
Patented Nov. 10, 1914.
5 SHEETS—SHEET 4.
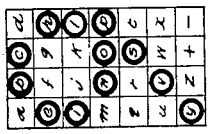
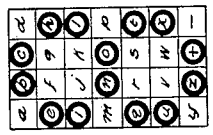
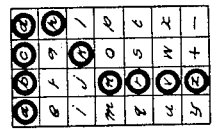
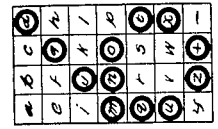
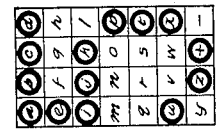
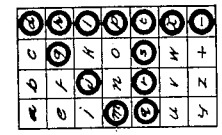
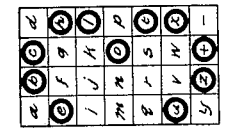
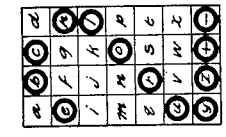
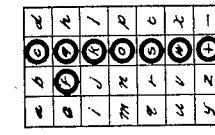
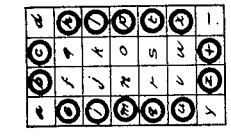
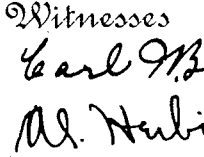
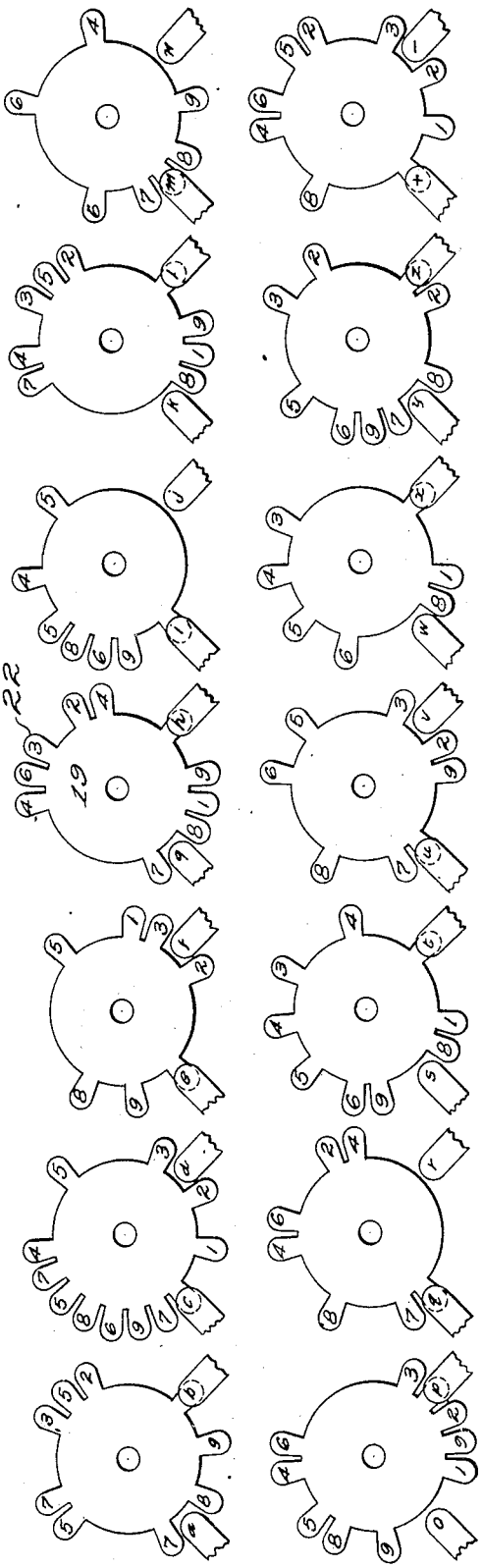
Fig. 5.  Fig. 6.
Witnesses
Carl W. Burst.
Al. Hubig
Inventor
Charles F. Kettering
J. B. Maynard
and R. C. Glass,
Attorneys

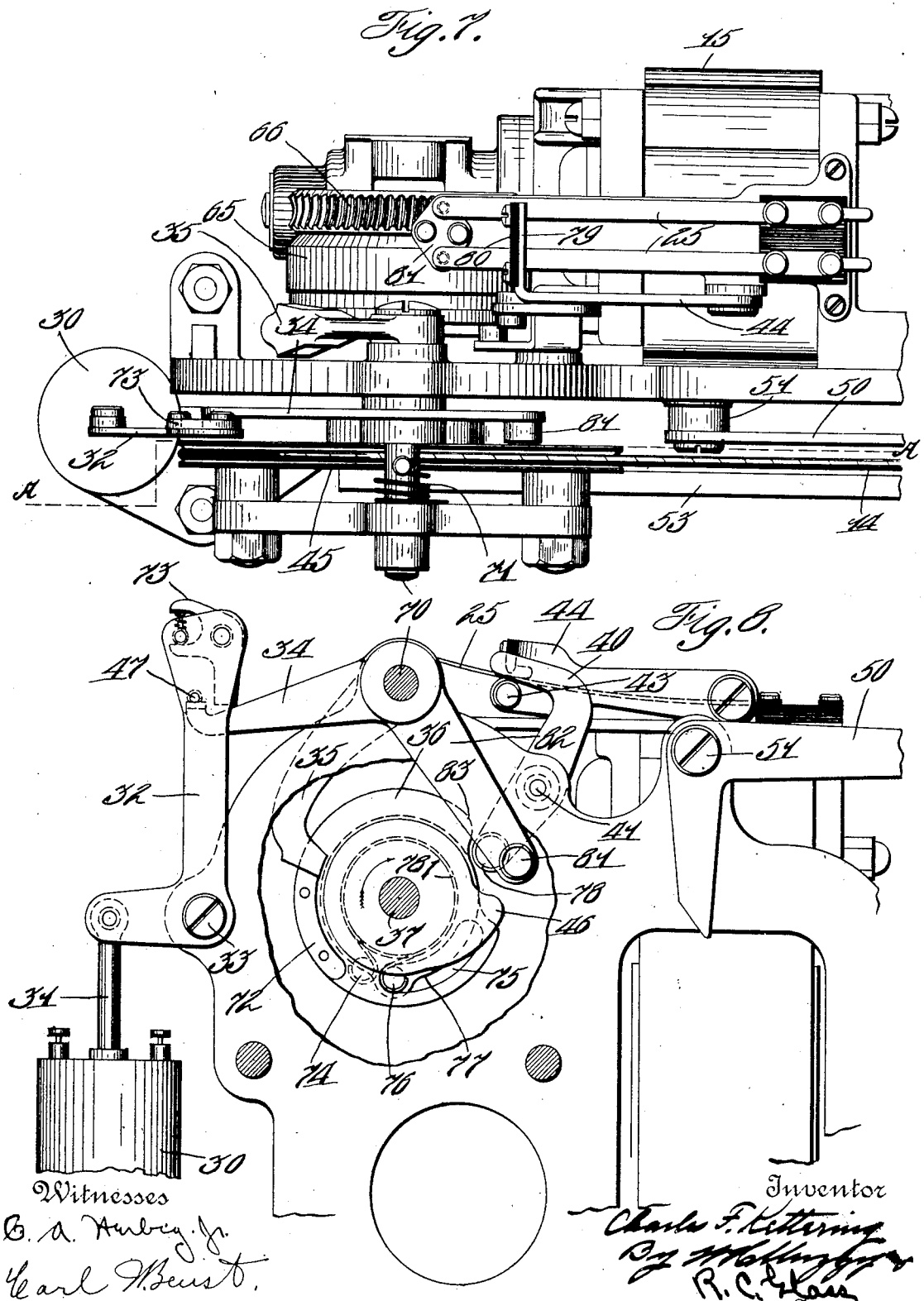

UNITED STATES PATENT OFFICE.

CHARLES F. KETTERING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

INDICATING MECHANISM.

1,116,440.  Specification of Letters Patent.  Patented Nov. 10, 1914.

Application filed December 21, 1907. Serial No. 407,510.

*To all whom it may concern:*

Be it known that I, CHARLES F. KETTERING, a citizen of the United States, residing at Dayton, in the county of Montgomery and State of Ohio, have invented certain new and useful Improvements in Indicating Mechanism, of which I declare the following to be a full, clear, and exact description.

This invention relates to indicating mechanism, but more particularly to such mechanism when used for exhibiting the characteristics of entries in a cash register or similar accounting machine.

The main object of the invention is to improve the construction of distant indicating devices rendering the mechanism more simple and less liable to get out of order.

Another object is to provide mechanism with which a low voltage electric current may be used in the cables; thereby enabling a silk and cotton covered cable to be used instead of a rubber covered cable and so lowering the cost of production. The mechanism is so designed that the low voltage current is constant no matter what system of power wires are employed.

Another object of this invention is to provide a simple switch device for controlling different combinations of lights of the indicators.

A further object is to provide in connection with the light circuit a suitable motor and drive mechanism for operating the indicator switches.

With these and incidental objects in view the invention consists in certain novel features of construction and combination of parts the essential elements of which are set forth in appended claims and a preferred form of embodiment of which is hereinafter described with reference to the drawings which accompany and form part of this specification.

Of said drawings: Figure 1 is a diagrammatic view of a cash register provided with drum indicators and electric contacts which control the operation of a distant indication device. Fig. 2 is a side elevation partly broken away of the distant indicators and controlling mechanism therefor. Fig. 3 is a top plan of the same. Fig. 4 is a vertical section through one of the solenoid stops which regulate the position of the contact members of the distant indicators. Fig. 5 contains ten diagrammatic views of the arrangement of lights in each denominational indicator, each view indicating a different numeral lighted. Fig. 6 is a top plan of a set of contacts for controlling one denomination of the indicator. Figs. 7 and 8 are enlarged views of the left hand portions of Figs. 3 and 2 respectively, showing the motor control mechanism in detail, Fig. 8 also being taken on line A—A of Fig. 7.

As the invention is shown, it is adapted to be employed with a cash register of any desired two motion type but it will be readily understood from the following description that the invention may be applied to many other types of cash registers and, in fact, may be used without registering amounts at all. The indicating devices of the register are arranged to control the operation of the distant indicating mechanism through electrical connections whereby the register and the register indicators are first positioned in accordance with the entry made in the register and the distant indicator is positioned entirely out of the control of the operator. An electric motor is provided to operate the distant indicator controlling mechanism to an extent determined by the position of the register indicator. The motor is controlled entirely from the distant cash register and a magneto supplies the current for the cables from the register to the distant indicating mechanism and the current for the distant indicator connections. This magneto is arranged to be driven by the said motor thereby dispensing with a switch for the cable connections and thereby also producing the great advantage that the indicator connections do not have to be made in accordance with the line current which actuates the motor. The voltage of the magneto is of course dependent on its speed of rotation and this rotation may be maintained constant no matter by what kind of a current its driving motor is actuated. The magneto current is of small voltage so that there is little difficulty about insulating the cables to satisfy the requirements of the fire underwriters. As shown herein, the distant indicating mechanism comprises a series of lamps one series for each bank, and manipulative devices for controlling the register and circuit connection and provided for lighting any desired combination of lamps in the series to thereby produce what is known in the art as "monogram indications".

The register to which the indicating device may be attached may be of any well known type but as here shown, a two motion machine is used. Banks of keys serve to determine the position of differentially movable segments which are geared positively to a usual type of cylinder indicators having numbers on their peripheries. The main operating shaft, to which may be attached a crank handle or other device, serves to operate the mechanism and thereby differentially to position the said drum indicators. Each indicator cylinder is provided with a switch arm arranged to move over a series of contacts which are connected through cables to the distant indicator and serve to control its operation.

The form of monogram or changeable indicator shown is well known at present and the lamps are separately wired as shown in Fig. 2 to a series of pairs of fixed contact points. Adapted to co-act with these contact points are rotating disks having projections such as are shown in Fig. 6 and which serve to determine which of the lamps shall be lighted.

A motor is provided for rotating the contact disks of the distant indicator. This motor is arranged to drive said disks by a belt. When the motor starts the series of contact disks are depressed to an extent sufficient to break the lamp circuit and are then rotated by the motor until stopped by solenoids, which are under the control of the register indicating drums, and the operating current for which is supplied by the magneto. The magneto is driven by the said motor so that the current is only furnished in cables from the register to the distant indicator while the indicator is being operated. The circuit for the motor is controlled by the main operating shaft of the cash register. The motor however is arranged to break its own circuit at the end of the operation, thereby insuring a complete operation of the motor and consequent complete setting of the disk contacts.

Referring more particularly to the drawings. In Fig. 1 is shown a side elevation of one bank of keys of a cash register with an indicating drum 7 for said bank and a differentially movable gearing controlled by the bank. The drum 7 is revoluble with the differentially movable gear 8 and has secured thereto a switch arm 9. In the path of the switch arm 9 is a series of contacts 10 corresponding to the numerals on the indicator drum 7. These contacts are each connected by separate wires to corresponding solenoids 11 in the distant indication device. (Figs. 2 and 3). The solenoids 11 are used to control the revoluble contact members 12 which control the lamp indicators 13. The revoluble contact members 12 through a belt connection 14 are operated by a small motor 15, which may be in the regular light circuit with the lamps of the distant indicator. The motor 15 also serves to operate a small magneto 16 which supplies current to the small switch controlling solenoids 11 by means of wires 17 and 18.

Each denomination of the distant indicators is provided with a contact member 12. These contact members consist of a series of disks 19 rigidly mounted on revoluble shafts and connected by a wire 24 to form one solid conductor. Each denomination of the indicators is provided with 28 lights arranged as shown in Fig. 5. For convenience in illustrating, each lamp is marked with an individual letter and its corresponding fixed contact 23 to which the lamp is wired is marked with a like letter on Fig. 2. The fixed contacts are arranged at the side of the revoluble contact member 12 as shown in Fig. 2. Fig. 2 also shows the wiring between the fixed contacts and the lamps of one denomination of the indicators. All of said lamps have a common return wire 21. There are 14 of the disks 19 comprising each of the contact members 12 and each of said disks are provided with the right number of contact extensions to provide for the lighting of one or both of two of the lamps of the indicator when either of said lamps are needed in forming any numeral. It will be seen from the arrangement of the contacts in Fig. 6, that if the disks were in contact as shown in Fig. 6, the figure 0 would be lighted at the indicator; if said disks were turned one tenth of a revolution to the right, the figure 1 would be lighted at the indicator; if they were turned two tenths of a revolution, the figure 2 would be lighted, and so on to nine tenths when the figure 9 is lighted. These contacts 19 are arranged one above the other as shown in Fig. 6.

As stated above the members 12 are constructed to form a solid conductor. Two extra disks 19' are provided for the member 12, which disks, in all positions of the member, coöperate with two fixed contacts similar in form to the fixed contacts 23. To these fixed contacts is connected the common return wire for the circuits of all the lamps of the indicator appropriate to the member 12. In the present instance two disks 19' and fixed contacts 23 are provided merely for the purpose of forming a more reliable contact for the common return. It will, however, be readily seen that this number is not essential as one or more disks and contacts would work equally as well.

The motor switch 25 is controlled by the main operating shaft 26 of the cash register by means of a switch 27 and a local circuit 28. A cam 29 rigid with the shaft 26 closes the switch 27 during the time said shaft makes a complete revolution. The main operating handle is secured to the shaft 26 and is operated as usual after the amount keys have been depressed. When the circuit 28 is closed a solenoid 30 of the distant indication device which is included in said circuit 28 (Fig. 2) becomes energized and draws down its armature 31 and the arm 32 which is connected to the arm 31, and pivoted to the frame of the distant indication device at 33. The movement of the arm 32 carries the pin 47 thereon from over the flange on the spring pressed arm 34. The arm 34 is rigidly mounted on a shaft 70, which shaft, under the influence of spring 71, has a tendency to turn, thereby raising the arm 34, but such movement is normally prevented by reason of the engagement of the outer end of said arm with the pin 47 mounted on the upwardly extending arm 32, as above described. Also rigidly mounted on shaft 70 is a downwardly extending arm 35, the lower end of which projects in the path of a plate 72 mounted on the side of a cam disk 36, having the camming shoulder 83. The disk 36 is mounted to turn loosely on shaft 37 and is further provided with a pin 74 and elongated slot 75 through which slot projects a pin 76 mounted on a companion disk 77 which disk is rigidly mounted on the shaft 37. A spring 781 is wound about said shaft 37 and the ends of said spring are attached to the pins 74 and 76 for the purpose of rapidly rotating the disk 36 when the arm 35 is moved out of the path of the plate 72 upon the rocking of shaft 70, as above described. The rotation of said disk 36 will cause its cam shoulder 83 to strike an antifriction roller 78 mounted on an arm 40, pivoted to the main frame at 41. The arm 40 has a projection at its upper end, which projection extends over an antifriction roll 43 on a switch controlling lever 44. The switch controlling lever 44 is provided with a lateral extension 79, which extension is provided with an insulating plate 80 which extends over the two contact fingers 25. When, upon the rotation of the disk 36, the camming shoulder 83 strikes the antifriction roller 78, it will cause the arm 40 to rock about its pivot 41 and through the medium of the projection at the upper end of the arm 40 will depress the antifriction roller 43 and switch controlling lever 44, thus bringing the contact fingers 25 into contact with contact plate 181, thereby closing the motor circuit. The rotation of the disk 36 is limited in extent by the end of the elongated slot 75 striking against the pin 76 extending therethrough, and, as above described, mounted on the disk 77 rigidly mounted on the shaft 37. This limited rotation of the disk 36 is, however, sufficient to bring the extended periphery of the said disk under the antifriction roller 78 and thus hold the motor circuit switch closed. Just prior to the completion of a single rotation of shaft 37 the camming shoulder of disk 46 will engage an antifriction roller 81 on an arm 82 which arm is rigidly mounted on the shaft 70. This engagement of the cam 46 with said antifriction roller 81 will cause said arm 82 to rock shaft 70, thereby again bringing the arm 35 into the path of the plate 72. This movement will arrest the disk 36, on which said plate 72 is mounted, in a position in which the antifriction roller 78 may drop into the depressed portion of the disk 36, thereby permitting the breaking of the motor circuit. The rocking of the shaft 70 by the movement of the arm 82 will also cause the downward movement of the arm 34 to permit the pin 47 on arm 32 to again spring over its forward end. As shown in Figs. 3 and 8, there are two spring contact fingers 25; one of these controls the motor circuit while the other is intended to control a condenser which may be introduced into the circuit for the purpose of preventing a spark when the circuit is broken.

The motor 15 drives the belt sheave 45 through the worm gearing 66. The sheave 45 makes one revolution at each operation of the machine and the switch 25 is automatically opened when the sheave completes a revolution by the arm 40 dropping into the cutaway portion of the cam 39 and releasing the switch arm 44. The cam 46 returns the arm 34 to normal position in under the pin 47 on the member 32.

Slack in the belt 14 is taken up when the sheave 45 is revolved by the spring belt tightener 48. The belt tightener 48 consists of a sheave 49 mounted on a bell crank 50 and bearing against the belt 14. The bell crank 50 is pivotally mounted at 51 and the opposite end to that on which the sheave is mounted bears against the roller 52 which is mounted on a reciprocating arm 53. The arm 53 is drawn forward so as to release the belt tightener by the box cam 54 which is rigid on the shaft 37 and engages the roller 55 on the arm 53.

The belt revolves the contact members 12 by engagement with the sheaves 56 which are rigid on the shafts 20. When the contact member 12 has been stopped by one of the solenoids 11 the belt 14 of course slides on the sheave 56 until the arm 35 engages the stop 36. Each contact member 12 is provided with a stop arm 57 which engages any one of the solenoid armatures which may be moved into the path of said arm. The contact members 12 are vertically movable into and out of contact with the fixed contacts 23 so that the contacts will not engage while the member 12 is being rotated. It would not be practicable to rotate the switch contacts 12 if they passed over all the fixed contacts 23 in such rotation as clearly this would cause an incorrect momentary lighting of the lamps. To prevent this undesirable result, the contact parts 12 are arranged to be depressed slightly during the time they are rotating so that no contacts are then made and no lamps lighted. After a rotation of the contact parts 12 is completed, they are again raised to engage the fixed contacts 23 and remain so engaged until a succeeding operation of the machine. To accomplish this function, levers connected to arms 53 as shown in Fig. 2 normally hold the members 12 in contacting position but when the arm 53 is drawn forward by the cam 54, the arm 58 will be free to rock downwardly and allow the members 12 to lower out of contacting position. The arm 53 will permit the return of the arms 58 at the end of each revolution of the shaft 37 so that the arms 58 will lift the members 12 into contacting position; that is, after the members 12 have been set into position to light the desired combination of lamps. An alining device 60 is rigidly secured at the bottom of each of the shafts 20 in position to be engaged by the arms 58 when said arms lift the members 12 into contacting position so that arms 58 aline the contact members 12 as well as operate them.

For each denomination of the indicator, ten solenoids are provided one for each character which is to be lighted. Each set of solenoids 11 is set into a soft iron casing 61 as shown in Fig. 4. The core of each of the solenoids consist of an immovable soft iron sleeve 62. A brass rod extends through said sleeve and is slidable therein, and said rod serves to stop the arm 57 when lifted up into the path of the said arm. Rigidly secured to the bottom end of the brass rod 63 is an iron armature 64 which normally drops away from said solenoid and carries with it the rod 62 when the solenoid is not energized. Of course when the solenoid is energized the armature 64 will be drawn up against the iron casing 61 of the solenoid and lift the rod 62 into the path of the arm 57.

The use of a magneto to furnish the current passing through the cables and operating the solenoids is of decided advantage in that the magneto may be driven from a motor of any voltage of either direct or alternating current. If the cable connections were on a line circuit, the resistance thereof would have to depend on the voltage of the line circuit and it would therefore be necessary to provide many different styles of parts to accommodate the current which was desired to be used. With the magneto, however, the line current passes through the motor only and the current developed by the magneto will be of constant voltage no matter what driving voltage is used. Furthermore, the magneto furnishes a fairly low voltage current thereby minimizing the danger of transmitting it through cables and making compliance with the fire underwriters easily possible. The magneto is driven only when the motor operates and there is therefore no current in the cables except during the small period of time occupied by the operation of the motor. In fact, no high voltage current passes from the cash register to the distant indicating mechanism as the current for operating the solenoid 30 may easily be of small voltage. The current for the lamps may be of any desired voltage but the switches therefor are all positioned at the distant indicating mechanism.

As far as the construction so far described is concerned, it would be possible to give say a half rotation to the main shaft 26 of the cash register and then allow the mechanism to stay in such position. As the motor controlling switch would then be closed, the solenoid 30 remains energized, and the pin 47 would thereby be permanently retained in front of the flange on switch lever 34 thereby allowing a continuous operation of the electric motor. This is of course undesirable and to avoid it there is provided a pawl 73 pivoted on controlling arm 32 which is positioned to be rocked by the flange on arm 34 when the solenoid 30 is energized and the arm 32 moved. If at the end of an operation of the motor the solenoid 30 is still energized, the return of the locking lever 35 to its normal locking position will depress arm 34 enough so that the depending end of pawl 73 may pass over the flange on said arm 34. This will prevent a second releasing of the motor switch until the solenoid is deënergized and the return of switch arm 32 to normal position permitted. The mechanism will then be again operative.

It is thought that the operation of the device will be clear from the foregoing description but the circuit wiring may be briefly referred to. The motor release circuit is very simple including some generator shown as a battery on Fig. 1 which battery supplies a low voltage current through the wiring on Fig. 1 and reaching to the solenoid 30 on Fig. 2. This circuit is very simple and its operation will be obvious. As to the magneto circuits it may be said that there is a common wire 18 running from one brush to the indicator contacts 9 which are arranged in parallel. From the indicator contacts 10 multiple circuits run through the solenoids 11 in parallel and then combine to a common wire 17 running to the other brush of the magneto. These circuits are of low voltage inasmuch as they have only to control the solenoid armatures and need therefore only inexpensive insulation. The motor circuit itself is not shown on the drawings, but clearly any convenient power wiring may be employed to drive the motor inasmuch as the motor wiring has no necessary connection with the rest of the apparatus. The light circuits are shown on Fig. 2 where L indicates the line wires which in practice would usually be the regular lighting circuit of the establishment. It will of course be understood that although only one indicator is shown on Fig. 2 there would nevertheless be a plurality of such indicators, one for each bank of keys, but the circuits would be precisely the same as those shown and common line wires L may be used. The circuits from the cash register to the distant indicator are all of low voltage, the only high voltage used being for the lights and the motor, and these high voltage circuits are entirely at the distant indicator.

As to the construction of the disks for the lamps circuits, this will be clear from a study of Fig. 6. The disks 19 may be considered as divided into twenty parts circumferentially, some of which are cut away on all of the disks leaving the necessary contact exceptions. The disks are moved in steps equal to one tenth of a rotation which is clearly the distance between alternate projections 22 and the stationary contacts 23 are positioned apart a distance equal to an odd number of twentieths of a rotation so that the projections 22 which may contact with one of the stationary projections 23 will not contact with the other stationary projection. On Fig. 6 the projections 22 are marked with the number for the indication of which they are employed, for example, consider the contact marked c on Fig. 6. It will be seen by reference to Fig. 5 that the lamp c will be used when 0, 1, 2, 3, 5, 7, 8 or 9 is to be indicated and therefore projections 22 on the proper disk in Fig. 6 are arranged so that the corresponding number of steps or tenths of rotation of the contact disk will bring the projection 22 directly under the stationary contact c. Clearly the projections marked 1, 2 and 3 on the proper disk on Fig. 6 will be moved under contact c by respectively 1, 2 and 3 steps of rotation. There is no projection marked 4 so that four steps of rotation will not light lamp c. There is a projection marked 5 and this is exactly opposite contact c in the diagram so that five steps of rotation will bring the said projection 22 under contact 23. Without following this matter out more in detail it will be evident that all the projections are positioned to light the proper lamps and to give therefore the proper indication.

Each contact member 12 as a whole may be considered as a single movable member or contact having divisions (the separate disks 19), each division having sub-divisions in which are differentially arranged the various contact projections 22.

Some of the advantages of the construction have been previously referred to, but the additional advantage that by the use of the magneto there is no circuit in the cables when the register indicators are moving may be mentioned. If there was such a circuit the contacts 10 and 9 would be injured gradually by sparking, but with the construction no such sparking occurs.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow. For example, the generator 16 has been referred to as a "magneto" but clearly forms of generators or dynamos could be used other than ones having a permanent magnet field. So, too, various forms of accounting devices having movable parts may be employed, in place of the typical cash register shown.

What is claimed is:

1. In a machine of the character described, the combination with an accounting device, of an electric light indicator, said indicator comprising a number of electric lamps, and automatic means operated by the accounting device for lighting any combination of said lamps so as to form characters which correspond to the setting of the accounting device; said means including a series of contacts mounted on a revoluble member, fixed contacts mounted in the path of said series of contacts, and means for differentially rotating said revoluble member.

2. In a machine of the character described, the combination with an accounting device, of an indicating device electrically controlled through the setting of the accounting device, said indicating device comprising a number of electric lamps; switches for said lamps, means controlled by the accounting device for closing any combination of said switches, said means including a motor; and a magneto driven by the motor for furnishing current to operate the switches.

3. In a machine of the character described, the combination with an accounting device, of an indicating device electrically connected to and controlled by the accounting device, comprising a plurality of contacts; a revoluble contact member adapted to contact at different positions with different combinations of said contacts and control the setting of the indicating device, and means for revolving said contact member.

4. In a machine of the character described, the combination with an accounting device, of an indicating device electrically connected to and controlled by the accounting device, comprising a revoluble contact member adapted to contact at different positions and control the setting of the indicating device; a motor for rotating the contact member, a series of magnetically operated stops for controlling the extent of rotation of the contact member, a magneto for supplying current to operate the stops.

5. In a machine of the character described, the combination with an accounting device, of an indicating device electrically controlled by the accounting device, said indicating device comprising a plurality of indicators each controlled by a series of contacts which are movable into different contacting relations, and means controlled by the accounting device for moving said contacts.

6. In a machine of the character described, the combination with an accounting device, and indicators, of a motor for controlling the indicators, the operation of said motor being controlled by the accounting device, a belt driven by the motor and connecting the motor to the indicating device, a tightener for the belt, and means for automatically tightening said belt when the belt is in operation.

7. In a machine of the character described, the combination with an accounting device, of an indicating device comprising a number of electric lamps, switches for said lamps, means controlled by the accounting device for predetermining which of said switches are to be closed and a second means controlled by the accounting device for closing such switches.

8. In a machine of the character described, the combination with an accounting device of an indicating device electrically connected to and controlled by the accounting device, said indicating device comprising indicators, a number of fixed contacts connected to the indicators, a movable contact adapted to engage different combinations of fixed contacts at different positions and means for differentially moving the movable contact.

9. In a machine of the character described, the combination with an accounting device, of an indicating device electrically controlled through the setting of the accounting device, said indicating device comprising a number of electric lamps capable of coöperation in series to permit a plurality of indicia in the same area, an independent circuit for each of said lamps, and a differentially adjustable device controlled by the accounting device but structurally separate therefrom for closing any combination of said circuits.

10. In a machine of the character described, the combination with an accounting device, of an electrically controlled indicator, said indicator comprising a revoluble contact member; means controlled by the accounting device for differentially rotating the contact member, a series of contacts mounted in axial alinement with the revoluble contact member, said member having a plurality of integral or connected parts each adapted to contact with the different ones of the series of contacts according to the degree to which the member is rotated, and means for moving the contact member in an axial direction relatively of the fixed contacts.

11. In a machine of the character described, the combination with an accounting device, of an indicator electrically controlled by the accounting device, a series of contacts, a movable member divided according to the number of contacts, each division being divided into a plurality of sub-divisions, contacts projecting from certain of said sub-divisions, and means for differentially moving said movable member so as to contact with different combinations of the series of contacts.

12. In a machine of the character described, the combination with an accounting device, of an indicator electrically controlled by the accounting device, a motor, a controller for the motor which is operated by the accounting device, indicator circuits, switches for the indicator circuits, and a magneto driven by the motor for supplying current to control the indicator switches.

13. In a machine of the character described, the combination with an accounting device of an electrically controlled indicator, an indicator controlling circuit, a magneto in said circuit, a switch in said circuit, a motor, a motor circuit, a switch in the motor circuit, and means under the control of the accounting device for first closing the switch for the indicator circuit and then the switch for the motor circuit.

14. In an indicating mechanism, the combination with indicators, of differentially adjustable means for determining the indication of said indicators, accounting devices controlling said adjustable means, a motor for driving said adjustable means, and means also driven by said motor for causing the proper positioning of said adjustable means.

15. In an indicating mechanism, the combination with an indicating mechanism for exhibiting any of a plurality of indicia in the same area, of differentially adjustable contact devices for causing the indication, accounting devices, a motor for adjusting said contact devices, and circuits including said accounting devices and energized by said motor for determining the extent of adjustment of said contact devices.

16. In a machine of the character described, the combination with an accounting device, of an electric light indicator, said indicator comprising a number of electric lamps, and automatic means operated by the accounting device for lighting any combination of said lamps so as to form characters which correspond to the setting of the accounting device, said means including a series of contacts mounted on a revoluble member, fixed contacts mounted in the path of said series of contacts, and means for differentially rotating said revoluble member to an extent determined by the adjustment of the accounting device.

17. In a machine of the character described, the combination with an accounting device, of an indicating device electrically connected to and controlled by the accounting device, comprising a plurality of contacts, a revoluble contact member adapted to contact at different positions with different combinations of said contacts and control the setting of the indicating device, means for revolving said contact member to an extent determined by the adjustment of the accounting device.

18. In a machine of the character described, the combination with an accounting device, of an indicating device electrically controlled by the accounting device, said indicating device comprising a plurality of indicators each controlled by a series of contacts which are movable into different contacting relations, means controlled by the accounting device for moving said contacts, and a second means controlled by said accounting mechanism for differentially controlling the movement of said contacts.

19. In an accounting machine, an accounting device, electric means for operating the accounting device including a rotatable contact member having extensions and axially movable, a plurality of contacts mounted concentric with the rotatable member, and means for differentially rotating the rotatable member and moving it axially into contact with a desired one of said plurality of contacts.

20. In an accounting machine, the combination with an indicating device, of electric devices for operating said indicating device including two adjacently mounted contact members, one having extensions, and means for effecting a relative movement between said contact members rotationally and axially, whereby different contact connections may be selected and made by said extensions.

21. In an accounting machine, the combination with an indicating device comprising a plurality of lights, of a rotating and a stationary contact device for differentially controlling said lights, and means for causing engagement of said stationary with said rotating contact, constructed to prevent rotation of said rotating contact.

22. In an accounting machine, the combination with an indicating device, comprising a plurality of lights, of a stationary and a rotating contact device controlling said lights, a notched plate movable with said rotating contact, and an arm constructed to engage the notches of said plate and thereby cause engagement of said rotating with said stationary contact devices and prevent rotation of said rotating contact.

23. In an accounting machine, the combination with an indicating device, and a stationary and a rotating contact device controlling said indicating device, of a motor having connections to rotate said rotating contact, an arm constructed to cause engagement of said stationary with said rotating contact device, and to prevent rotation of said rotating contact, and connections from said motor to actuate said arm.

24. In an accounting machine, the combination with an indicating device, and a stationary and a rotating contact device controlling said indicating device, of a motor having connections to rotate said rotating contact to different desired positions, and an arm driven by said motor and constructed to cause engagement of said stationary with said rotating contact, and to prevent rotation of said rotating contact.

25. In a machine of the character described, the combination with a main accounting device, of an auxiliary accounting device comprising a plurality of lights, and a differentially adjustable device controlled by said main accounting device but structurally separate therefrom for lighting different combinations of said lights.

26. In a machine of the character described, the combination with a main operating device, of a main accounting device, an auxiliary accounting device comprising a plurality of lights, a differentially adjustable means for lighting different combinations of said lights, means rendered effective by an operation of the main operating device for adjusting said adjustable means, and devices controlled by said main accounting devices for controlling the extent of said adjustment.

27. In a machine of the class described, the combination with a main accounting device, of a distant auxiliary accounting device comprising a plurality of lights, a differentially adjustable means structurally separate from but electrically connected with both of said accounting devices for lighting different combinations of said lights, and means under control of said main accounting device for controlling the adjustment of said adjustable means.

28. In a machine of the character described, the combination with a main accounting device, of a distant auxiliary accounting device comprising a plurality of lights, a differentially adjustable means structurally separate from but electrically connected with both of said accounting devices for lighting different combinations of said lights, means rendered effective by an operation of the machine for adjusting said adjustable means, and devices controlled by said main accounting device for controlling the extent of said adjustment.

29. In a machine of the character described, the combination with an accounting device, of an indicator comprising a number of lights, and an automatically and differentially operable means controlled by said accounting device but structurally separate therefrom for lighting any combination of said lights.

30. In a machine of the character described, the combination with an accounting device, of an indicator comprising a number of lights, automatically operable means controlled by said accounting device for lighting any combination of said lights, said means including a series of contacts mounted on a revoluble member, fixed contacts mounted in the path of said series of contacts, and means for differentially rotating said revoluble member.

31. In a machine of the character described, the combination with a main accounting device, of an auxiliary accounting device comprising a plurality of lights, differentially adjustable means controlled by said main accounting device for lighting different combinations of said lights, said adjustable means comprising a plurality of contacts, a revoluble contact member adapted to contact at different positions with different combinations of said contacts.

32. In a machine of the character described, the combination with a main accounting device, of an auxiliary accounting device comprising a plurality of lights, a differentially adjustable means for lighting different combinations of said lights, a motor rendered effective by an operation of the machine for adjusting said adjustable means, and a series of magnetically operated stops for controlling the extent of said adjustment.

33. In a machine of the character described, the combination with a main accounting device, of an auxiliary accounting device comprising a plurality of lights, a differentially adjustable means for lighting different combinations of said lights, a motor rendered effective by an operation of the machine for adjusting said adjustable means, a series of magnetically operated stops for controlling the extent of said adjustment, and selecting means controlled by the main accounting device for selecting the stop to be operated.

In testimony whereof I affix my signature in the presence of two witnesses.

CHARLES F. KETTERING.

Witnesses:
RAY C. GLASS,
CARL W. GEUST.